(12) United States Patent
Gresset et al.

(10) Patent No.: US 8,991,309 B2
(45) Date of Patent: Mar. 31, 2015

(54) ROUND BALER

(75) Inventors: Pascal Gresset, Auxon Dessous (FR);
Mickael Zabe, Roche et Raucourt (FR);
Emmanuel Chapon, Velet (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/557,862

(22) Filed: Jul. 25, 2012

(65) Prior Publication Data

US 2014/0190360 A1   Jul. 10, 2014

(30) Foreign Application Priority Data

Jul. 27, 2011   (DE) .......................... 10 2011 079 940

(51) Int. Cl.
*A01F 15/08* (2006.01)
*B30B 5/04* (2006.01)

(52) U.S. Cl.
CPC .................................. *A01F 15/0883* (2013.01)
USPC ........................................................... 100/88

(58) Field of Classification Search
CPC ............ A01F 15/0875; A01F 15/0833; A01F 15/0883
USPC ............... 100/7, 87, 88, 89; 56/341
See application file for complete search history.

(56) References Cited

U.S. PATENT DOCUMENTS

| | | | |
|---|---|---|---|
| 6,457,295 B1 * | 10/2002 | Arnold | 53/211 |
| 6,807,901 B2 * | 10/2004 | Bentzinger et al. | 100/40 |
| 7,578,119 B2 * | 8/2009 | Viaud | 56/341 |
| 7,805,914 B2 * | 10/2010 | Smith | 56/10.7 |
| 2005/0188862 A1 | 9/2005 | Hoover et al. | |
| 2005/0257513 A1 | 11/2005 | Smith et al. | |
| 2006/0278103 A1 * | 12/2006 | Derscheid | 100/88 |

FOREIGN PATENT DOCUMENTS

| | | |
|---|---|---|
| DE | 10338349 A1 | 8/2004 |
| DE | 102005036181 | 2/2007 |
| DE | 102006038299 A1 | 2/2008 |
| DE | 102011079937 A1 | 1/2013 |
| EP | 1264531 A1 | 12/2002 |
| EP | 1731023 A1 | 12/2006 |
| EP | 1889534 A1 | 2/2008 |

OTHER PUBLICATIONS

European Search Report dated Nov. 14, 2012 (8 pages).
German Search Report issued in counterpart application No. 102011079940.0, dated Sep. 4, 2014 (7 pages).

* cited by examiner

*Primary Examiner* — Jimmy T Nguyen

(57) ABSTRACT

A round baler is provided having a frame, a baling chamber on the frame for forming a round bale, an unloading area provided between the baling chamber and a ground surface and at least one depositing element which is arranged in the unloading area and which extends parallel to the rotational axis of the round bale and serves for supporting the round bale during an unloading operation. To reduce mechanical stress on the round bale caused by the depositing element and as a result to prevent damage to the round bale, a flat section is provided which, compared to the rollers otherwise usually used as depositing element, provides a higher contact surface for the round bale such that the surface pressure during the impact of the round bale can be decisively reduced compared to the use of a roller.

6 Claims, 4 Drawing Sheets

ROUND BALER

FIELD OF THE DISCLOSURE

The disclosure relates to a round baler having a frame, a baling chamber provided on the frame for forming a round bale, an unloading area provided between the baling chamber and a ground surface and at least one depositing element which is arranged in the unloading area and which extends parallel to the rotational axis of the round bale and serves for supporting the round bale during an unloading operation.

BACKGROUND OF THE DISCLOSURE

When unloading a round bale out of the baling chamber of a round baler, it is desired to control the movement of the bale. A problem arises, in particular, in the case of round bales which are wrapped with a net or twine and are subject to a highly dynamic unloading operation. During the unloading operation, the round bale, is released from the baling chamber and falls, for example, onto an unloading ramp which is provided with depositing elements which translate the round bale into a controlled rolling movement. Depending on the development and arrangement of the unloading area, the round bale often experiences an extreme change of direction in its movement, in particular in the case of highly dynamic, rapid unloading operations, as take place in the case of heavy-duty, modern round balers. Such a round baler is disclosed, for example, in German Patent Document DE 10 2005 036 181 A1. The unloading operations encumbered with such extreme changes in direction for the round bale lead to extreme stresses on the round bale which often result in damage to the round bale, in particular to tears in the net or in the twine when the round bale falls onto the depositing elements and is to be transferred from an almost vertical unloading movement into a horizontal unloading movement or rolling movement.

In order to counteract these types of damage, it is known, for example, in WELGER round balers, to provide a support element in the form of a roller on an unloading ramp, said roller being mounted by way of springs on the frame or on an unloading ramp in order to absorb part of the movement energy of the round bale. This type of design of a roller mounted on springs works out, however, as structurally expensive, maintenance intensive and susceptible.

SUMMARY OF THE DISCLOSURE

The object underlying the disclosure is to specify a round baler of the aforementioned type, by way of which the aforementioned problems are overcome.

According to the disclosure, a round baler of the aforementioned type is provided with a depositing element, which is provided as a flat section. By way of the flat section, which can be provided as a plate, sheet or the like, a planar contact point for the bale is created which presents a larger contact area for the round bale compared to a curved or round contact surface, as a result of which the surface pressure and consequently also the dynamic stress on the round bale can be reduced in such a manner that the abovementioned damage does not occur to the round bale. In its movement during the unloading operation, the round bale is consequently picked up by way of a contact surface which is greater in comparison to a roller such that mechanical stress on the outer cover or the edge layer of the round bale caused by the depositing element is reduced. The depositing element can be provided as part of an unloading ramp coupled to the frame of the round baler or can be fastened directly to the frame itself. The depositing element, in this case, is arranged below the baling chamber in the unloading area such that the round bale falls onto the depositing element during unloading. The unloading area describes the entire area which is run through by the round bale when it leaves the baling chamber. Associated therewith, in particular, are an unloading opening which opens the baling chamber and through which the round bale is guided, the area in which an unloading ramp is arranged, by way of which the round bale is directed onto the ground surface as well as an area in between, through which the round bale is either guided or moves on account of its gravitational force or its momentum of movement. So that the round bale is transferred from an approximately vertical movement into a horizontal movement during the unloading operation, the depositing element can be arranged in such a manner that the round bale falling onto the depositing element lies behind the depositing element with its rotational axis in the forward-travel direction such that through the depositing element a rotational momentum (movement momentum), which is directed onto the round bale and acts in opposition to the forward-travel direction, is generated for the round bale. The depositing element can, however, also be arranged centrally with respect to the rotational axis or in such a manner that the round bale lies in front of the depositing element with its rotational axis in the forward-travel direction. The rotational momentum can then be enforced, for example, by additional means.

The depositing element can extend at least over part of the width of the round bale, preferably over the entire width of the round bale, wherein partial portions can also be arranged distributed over the width such that the round bale is supported in sections over its width.

The flat section can be provided so as to be resiliently deformable such that it can deform resiliently during the unloading operation under the influence of the round bale. The flat section can be provided as a metal sheet or also as a plastic material plate for this purpose. Other materials with the same or similar resilient characteristics can also be used.

In addition or as an alternative to this, the depositing element can also be suspended so as to be pivotable such that a pivoting movement is introduced during the unloading operation under the influence of the round bale, wherein the depositing element is connected to elements cushioning the pivoting movement. The cushioning elements can be provided, for example, as mechanical spring elements (spiral springs, helical springs, leaf springs etc.), hydraulic spring elements (hydraulic cylinders etc.) or also as pneumatic spring elements (pneumatic cylinders etc.) or also as resilient buffers or dampers, for example of vulcanized rubber or natural rubber.

In addition or as an alternative to this, the flat section can be provided with a resilient layer which is deformable resiliently during the unloading operation under the influence of the round bale. By the round bale influencing a resilient layer in a direct or indirect manner during the unloading operation, it is possible to compensate for part of the movement energy and to reduce the stress on the round bale in a considerable manner such that the abovementioned damage to the round bale is avoided. The round bale is consequently cushioned in its movement during the unloading operation and mechanical stress on an outer covering or an edge layer of the round bale caused by the depositing element is reduced.

The resilient layer can also be covered at least in part. This can be effected in the form of a casing or coating. The covering or casing or coating serves to protect the resilient layer and can be provided, for example, as a cover plate or by a different body which surrounds or covers the depositing element at least in part. A correspondingly durable or sturdy film can also be used.

The resilient layer can be formed from a foam material, an elastomer or a different resilient material. In this case, it is possible to use foam materials or foams or materials containing vulcanized rubber or natural rubber which have a corresponding resilience under the weight of the round bale and are able to deform under the influence of the kinetic energy of the round bale. Other materials with the same or similar resilient characteristics can also be used here.

BRIEF DESCRIPTION OF THE DRAWINGS

Embodiments of the disclosure are described in detail below with reference to the accompanying drawing figures wherein.

DESCRIPTION OF THE PREFERRED EMBODIMENT

Figure 1:
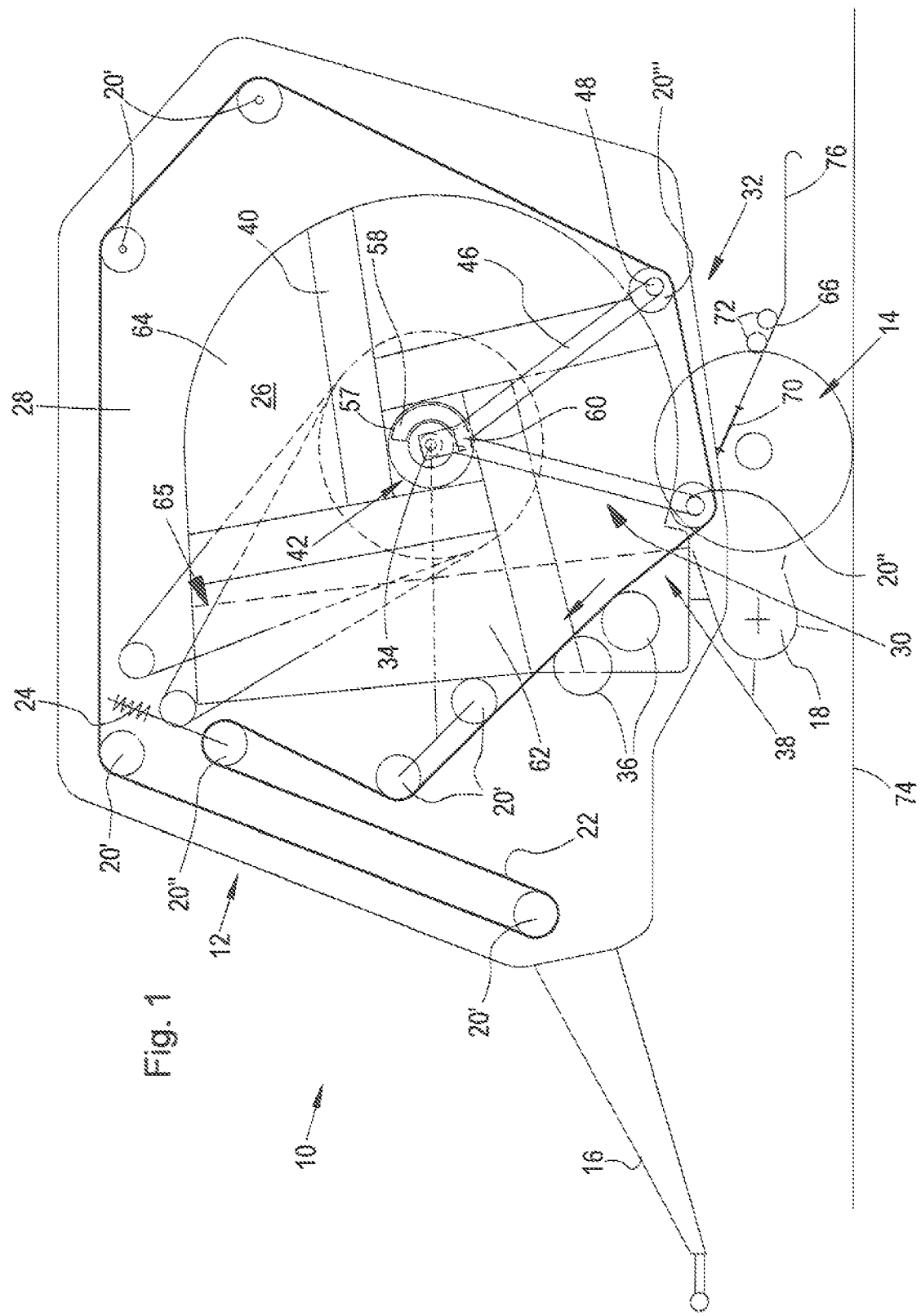
FIG. 1 is a schematic side view of a round baler according to the disclosure in a closed position with a first embodiment of an unloading ramp with a depositing element provided in the unloading area.

A round baler 10 shown in FIG. 1 includes a frame 12, a chassis 14, a shaft 16, a picking-up apparatus 18, rollers 20 (20', 20'', 20'''), baling elements 22, a tensioning apparatus 24, side walls 26, a baling chamber 28 defined by the side walls 26 and the baling elements 22, pivoting parts 30 as well as an unloading area 32.

In the exemplary embodiment shown, the round baler 10 is provided with a baling chamber 28, the size of which can be modified by way of movable baling elements 22, but it can also be provided with a non-adjustable baling chamber 28 with stationary baling elements. In the baling chamber 28, harvested crop picked up from the ground is formed into a so-called round bale which presses against the side walls 26 by way of its end faces.

The frame 12 is provided as a welded and/or screw-connected assembly, on which are fastened all the components of the round baler 10, which is supported on the chassis 14 and which is connectable to a towing vehicle (not shown) by way of the shaft 16. The frame 12 carries, among other things, cladding parts (not shown), some of the rollers 20, the side walls 26 and the pivoting parts 30. The frame 12 encloses the area surrounded by the side walls 26 and the baling elements 22 in a generous manner.

Without showing any detail, the chassis 14 consists of an axle and wheels on which the frame 12 rests.

The shaft 16 co-operates in a rigid or height-adjustable manner with the front end of the frame 12.

The pick-up apparatus 18 is provided in a usual manner as a so-called pick-up and is connected to the frame 12 so as to be height-adjustable. A cutting apparatus which is also known per se can be connected downstream of the pick-up apparatus 18. The pick-up apparatus 18 picks up crop deposited on the ground and forwards it via a cutting apparatus, present where necessary, into the baling chamber 28 where it is formed into a cylindrical round bale.

Some of the rollers 20 are rotatably mounted in a stationary manner in the frame 12 and are given the reference 20', another of the rollers 20 is adjustable against the force of a spring (not shown in detail) so that the baling elements 22 are able to yield to the growing diameter of the round bale and is given the reference 20''; further rollers 20 are pivotable about a pivot axis 34 on pivoting parts 30. Said rollers 20 are given the reference 20''' and are provided in width and extend with respect to each other in parallel in such manner that the baling elements 22 run above them and can enclose the baling chamber 28. Apart from the rollers 20, there are also provided rolling bodies 36 which are located above an inlet opening 38 into the baling chamber 28. The rolling bodies 36 serve as so-called starter rollers at the start of the bale-forming process, on which rollers part of the weight of the round bale is able to be supported.

The baling elements 22 are provided as belts which extend parallel to each other and cover the width of the baling chamber 28 in a substantial manner. In place of the design as belts, one in the form of a bar chain conveyor or a wide belt could also be selected, as is also known. In this case, only one baling element would therefore be present, which, however, is also to fall under the protection area. The baling elements 22 are endless and are set into circulating movement as a result of resting in a frictionally engaged or positive locking manner on at least one drivable roller 20. In the area of the inlet opening 38 the baling elements 22 form a bridge which forms into an inwardly widening loop as the harvested crop increases. The baling elements 22 are held under tension as a result of being guided via the position-adjustable roller 20'.

The tensioning apparatus 24 is formed in a known manner as a result of the roller 20'' being guided on an arm, carriage or the like (not shown) in opposition to the force of a spring and always holding a loop of the baling elements 22 in a tensioned manner.

In the view of FIG. 1, the side walls 26 essentially take on the form of a "D", the rear end area, on the right in FIG. 1, forming a curve which essentially follows the circumferential line of the finished round bale, i.e. an arc. The side walls 26 are provided in principle in two parts and include a front and a rear portion 62 and 64 which are connected together so as to be pivotable. Each portion 62, 64, however, can be assembled from several parts. The side walls 26 are at a spacing with respect to the frame 12 and can consequently be deflected outwards, as is described below. The rear portions 64 of the side walls 26 are provided so as to be deflection resistant by way of reinforcing struts 40, it being possible to screw connect or weld on the reinforcing struts 40. According to the representation in FIG. 1, the reinforcing struts 40 extend in an almost star-shaped manner with reference to the pivot axis 34 and extend tangentially past said pivot axis at a small spacing in order to butt against each other finally in a more or less vertical manner. As a result of this development, they enclose a square chamber 42 in this exemplary embodiment.

In their front end area, the rear portions 64 are connected so as to be pivotable in a limited manner via a pivot joint (not shown) and the front portions 62 are connected so as to be pivotable in a limited manner to the frame 12. The connection of the rear portion 64 to the front portion 62 is effected substantially along a more or less vertical line with a pivot joint axis 65 in the area of the front portion 62, i.e. in the area of the baling chamber 28. In the area of the pivot axis 34, each side wall 26 or the rear portion 64 thereof is guided along an axis which is fastened in a rigid manner on the frame 12 and at the same time serves as a pivot axis 34 for the pivoting parts 30.

The connection of the side wall 26 or side walls 26 can also be effected along an upper, more or less horizontal or slightly inclined line in a manner other than in the exemplary embodiment shown such that a downwardly opening divergence of the side walls 26 is produced when the round bale is ejected.

The size of the baling chamber 28 is changeable and at the start, i.e. with the baling chamber 28 empty, is defined by an approximately triangular cylindrical space between the picking-up apparatus 18 and the baling elements 22 and to the side by the side walls 26. As the harvested crop supplied increases, the baling chamber 28 widens and finally assumes a cross section which follows the form of the side walls 26 in the rear area.

The pivoting parts 30, in this exemplary embodiment, are provided on each side with one arm or several arms 46, which extend radially with respect to the pivot axis 34, and one cross-arm or several cross-arms 48, which are attached on the radially outside end thereof and extend transversely with respect thereto. A roller 20''' is provided at the end of each of the arms 46. The pivoting parts 30 are arranged on the axis 34 so as to be pivotable with the radially inside end of each arm 46. The position of the arms 46 is controlled by way of a drive (not shown) which includes a motor and per pivoting part 30 a pivot drive. The motor can be braked in its respective positions and holds the arms 46 in a correspondingly stationary manner. The control of the pivoting parts 30 is effected in such a manner that the front pivoting part 30 is adjusted during the bale-forming phase in order to be of assistance during the forming of a bale core, and that the rear pivoting part 30 assumes a lower position whilst the round bale is formed, and an upper position when it is ejected. The lower end position of the pivoting part 30 is shown in FIG. 1, the upper end position providing a position corresponding to a rotation of the pivoting part in an anti-clockwise manner by approximately 90 to 180°, in such a manner that the unloading area 32 is opened and a pressed bale is released by pivoting the pivoting part 30. It is pointed out that the front pivoting part 30 is not absolutely necessary.

The round baler described thus far is essentially described in all details in European Patent Application No. 01112927.7-2313 dated 6 Jun. 2001, the content of which is hereby also included in this application. On the other hand, the present disclosure can be used with any common model of round baler, as what matters is only that part of the side walls 26 pivots away outwards when the finished round bale is ejected and as a result can reduce the friction on the round bale.

A pressing apparatus 57 includes an ascending surface 58 and a following member 60 and serves the purpose of reducing the pressure and consequently the friction of the side walls 26 on the end faces thereof for ejecting and when ejecting the round bale such that the round bale can be unloaded in an easier manner out of the baling chamber 28. The ascending surface 58 is placed on a circular arc, which extends in a concentric manner with respect to the pivot axis 34, and is fastened on the outer surface of the two side walls 26, should it be sufficient, only one ascending surface would need to be provided i.e. on one side wall 26. In the present exemplary embodiment, the ascending surface 58 is formed from a curved steel wedge which is screw-connected onto the side walls 26 ascending in a uniform manner inside the chamber 42.

The following member 60 is provided on the side of the arm 46 of the rear pivoting part 30 added to the longitudinal centre plane of the round baler 10 and is provided as a sliding surface. The friction surfaces are lubricated to minimize friction; as an alternative to this, the following member 60 can also be provided as a rotating member in the form of a wheel, roller, ball or the like. The following member 60 is arranged in such a manner that it describes a round circuit when the pivoting part 30 rotates about the pivot axis 34 and moves along the ascending surface 58. The following member 60 is preferably always situated abutting against the ascending surface 58.

The following member 60 rests on the highest elevation of the ascending surface 58 when the rear pivoting parts 30 are situated in their lower end position—see FIG. 1—and the round bale can be created. When the pivoting parts 30 are moved into their upper end position, in which the round bale can be discharged out of the baling chamber 28, the following member 60 is moved to the lowest position of the ascending surface 58. The difference between the highest and the lowest position can be, for example, approximately between 20 and 50 mm.

As soon as a round bale is formed in the baling chamber 28, the rear pivoting part 30 is raised, upon which the rear portions 64 of the side walls 26 move outwards as a result of the pressure prevailing in the baling chamber 28 proceeding from the pressed harvested crop. As a result of this, the friction between the inner surface of the side walls 26 and the end faces of the round bale is reduced and the latter falls out of the baling chamber 28 as a result of the force of gravity. As soon as the round bale has left the baling chamber 28 and the round baler 10 has been advanced so far that the rear pivoting part 30 can be lowered again, a pivoting movement of the rear pivoting part 30 is effected in the opposite direction such that the following member 60 is moved to the largest elevation of the ascending surface 58 and at the same time presses the rear portions 64 of the side walls 26 inwards.

Figure 2:
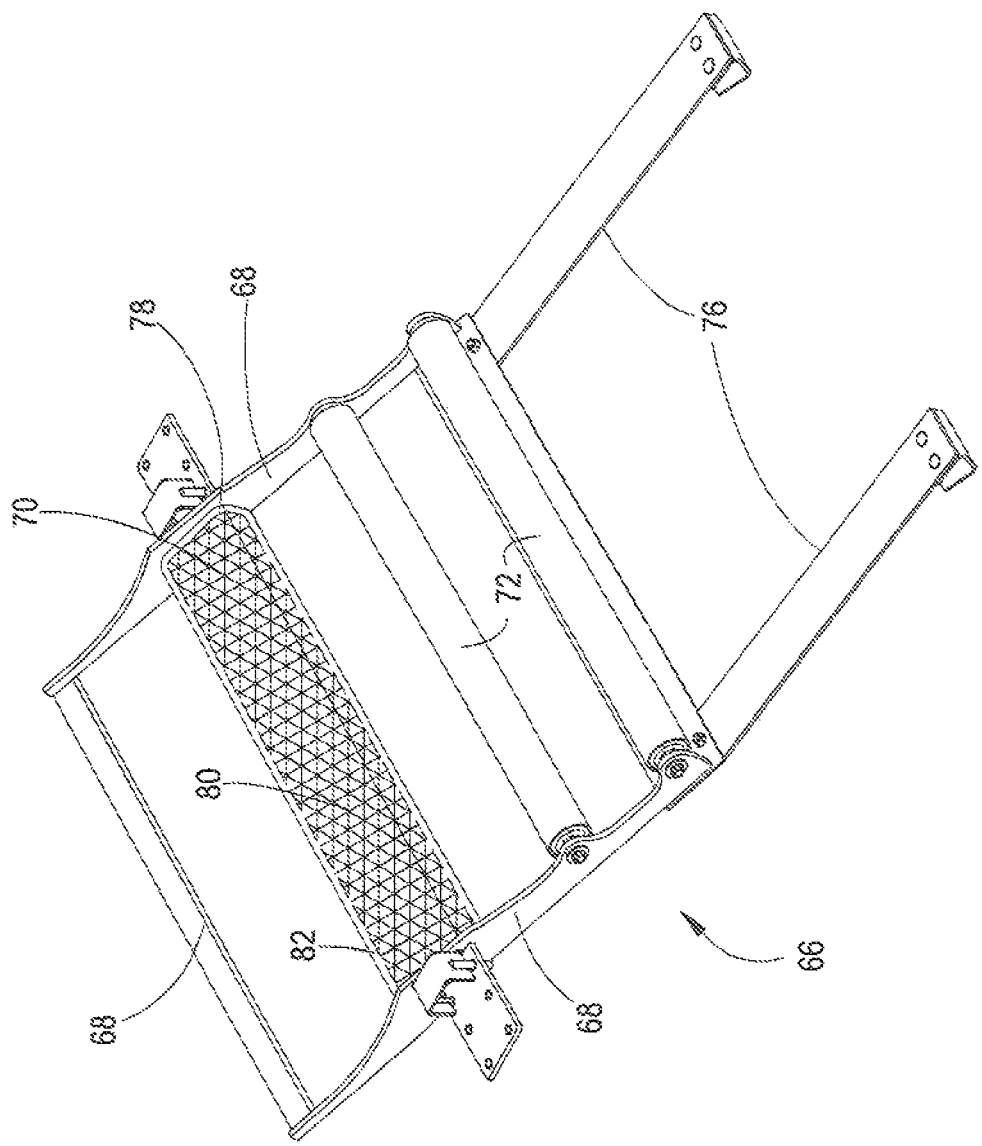
FIG. 2 is a schematic side view in perspective of the unloading ramp from FIG. 1 with a first embodiment of the depositing element.
Figure 3:
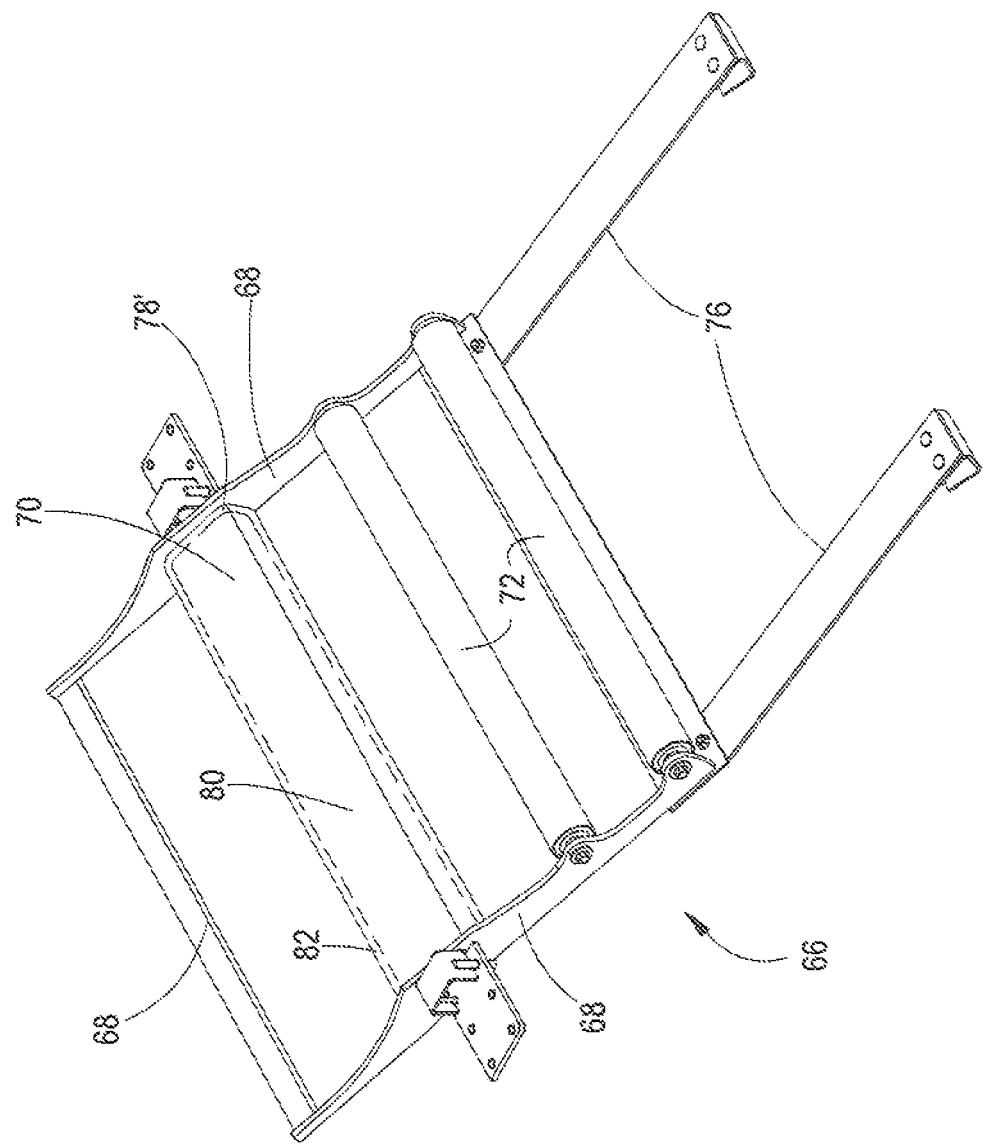
FIG. 3 is a schematic side view in perspective of the unloading ramp from FIG. 1 with a second embodiment of the depositing element.
Figure 4:
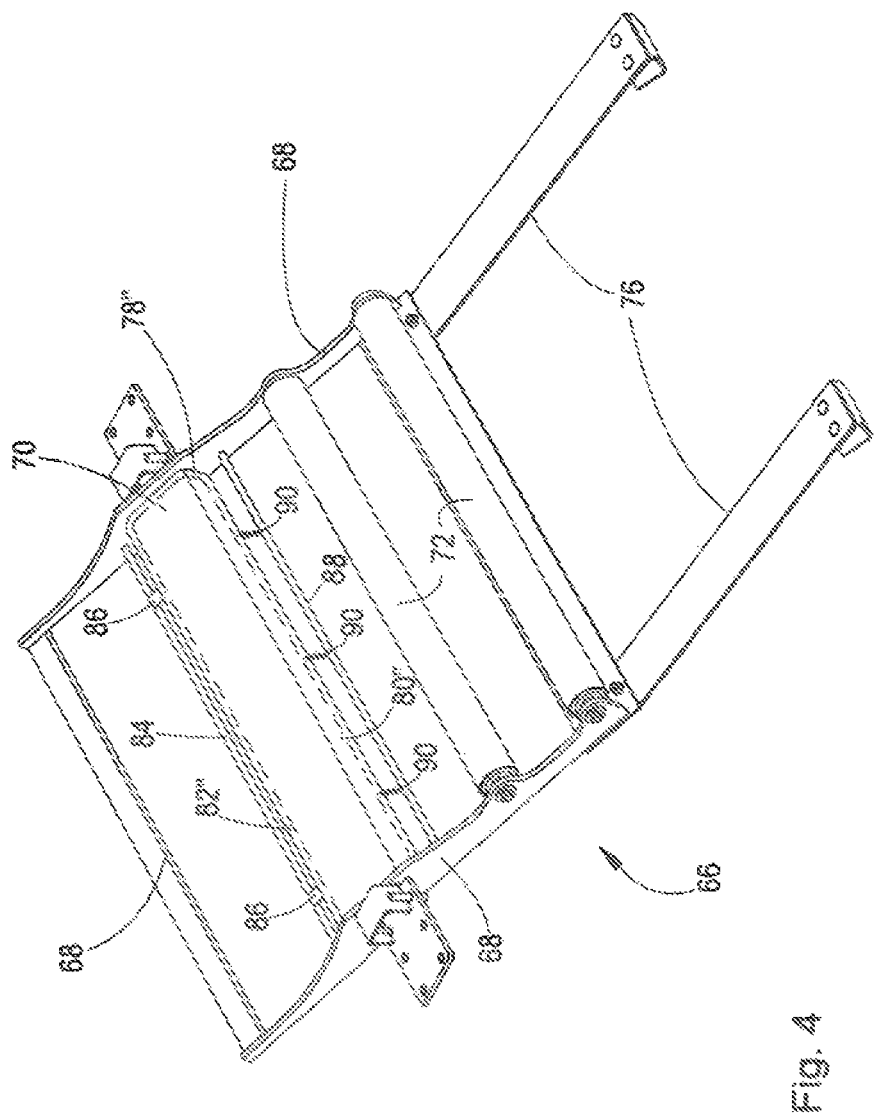
FIG. 4 is a schematic side view in perspective of the unloading ramp from FIG. 1 with a third embodiment of the depositing element.

The unloading area 32 includes an unloading ramp 66, as is shown in more detail in FIGS. 2 to 4.

The unloading ramp 66 includes a ramp frame 68 on which are fastened a first depositing element 70, which extends transversely with respect to the round baler 10, and further depositing elements 72, which extend transversely with respect to the baler and are provided as rollers. The ramp frame 68 is provided with an inclination which extends in the longitudinal direction of the round baler 10 and serves for the purpose of guiding an ejected bale onto a ground surface 74 in a controlled manner, the inclination falling away to the rear area of the round baler 10 (in opposition to the direction of travel). Spring struts 76, which, once the round bale has been guided via the depositing element 70, 72, deform in a resilient manner under the weight of the round bale and deposit the round bale in a resilient manner onto the surface of the ground 74, are attached on the lower area of the unloading ramp 66.

The unloading area 32 includes an unloading ramp 66, as is shown in more detail in FIGS. 2 to 4.

The unloading ramp 66 includes a ramp frame 68 on which are fastened a depositing element 70, which extends transversely with respect to the round baler 10, and further depositing elements 72, which extend transversely with respect to the baler and are provided as rollers. The ramp frame 68 is provided with an inclination which extends in the longitudinal direction of the round baler 10 and serves for the purpose of guiding an ejected bale onto a ground surface 74 in a controlled manner, the inclination falling away to the rear area of the round baler 10 (in opposition to the direction of travel). Spring struts 76, which, once the round bale has been guided via the depositing element 70, 72, deform in a resilient manner under the weight of the round bale and deposit the round bale in a resilient manner onto the surface of the ground 74, are attached on the lower area of the unloading ramp 66.

FIG. 2 shows a first embodiment of the depositing element 70. The depositing element 70 is provided as a flat section 78, preferably as a steel plate or steel sheet. The flat section 78 is mounted or fastened at both ends on the ramp frame 68. The depositing element 70 is arranged such that the round bale falls onto the flat section 78 during the unloading operation. In order to move a falling round bale in the direction of the descending unloading ramp 66, the depositing element 70 is preferably arranged in front of the rotational axis of the round bale in the direction of travel. The flat section 78 is surrounded by a resilient layer 80 (shown in a hatched manner in the Figs.), which preferably consists of foam material, but can also be provided from a different resilient material such as, for example, vulcanized rubber or another elastomer. In addition, a covering 82, which is also provided in the exemplary embodiment shown in FIG. 2 as a plate, preferably of plastics material, and covers the resilient layer 80 or screens it totally, is provided to protect the resilient layer 80. As an alternative to this, a correspondingly durable film which is bonded to or wound around the resilient layer 80 can be used as a covering 82. The covering 82 is provided in such a manner that it withstands the mechanical stresses caused by the round bale and protects the resilient layer 80 from damage. The covering 82 is mounted on the resilient layer 80 or on the flat section 78 in the form of a relatively sturdy plastics material plate. Under the influence of the weight of the round bale, the covering 82 or the plastics material plate is pressed downwards such that the resilient layer 80 is deformed or compressed by the undersurface of the covering. Consequently, part of the energy introduced by the round bale is cushioned. As soon as the round bale has left the depositing element 70, the plastics material plate moves back into the initial position as a result of the relaxation of the resilient layer 80. When a film is used as the covering 82, said film has to be provided so as to be correspondingly deformable such that the springy movements carried out by the resilient layer 80 are not impeded.

FIG. 3 shows a second embodiment for the depositing element 70 which corresponds to the embodiment from FIG. 2 only that, in this case, the depositing element 70 is provided as a flat section 78' in the form of a thin steel sheet such that there is no need for a resilient layer 80 and the flat section 78' in the form of a thin steel sheet itself carries out the resilient deforming under the influence of the weight of the round bale. At the same time, the depositing element 70 or the flat section 78' is, however, provided in a sufficiently strong manner to withstand the weight of the round bale without plastic deformation. Consequently, part of the energy introduced by the round bale is cushioned. As soon as the round bale has left the depositing element 70, the flat section 78' assumes its initial form again. In place of a steel sheet, it is also possible to use a plastics material plate with identical resilient characteristics. A covering can be dispensed with in the exemplary embodiment shown in FIG. 3 as no resilient layer is used which could be damaged by mechanical stress caused by the round bale.

FIG. 4 shows a third embodiment for the depositing element 70 which corresponds substantially to the embodiment from FIG. 2 only that, in this case, the depositing element 70, which is provided here as a flat section 78", is suspended in a pivotable and springy manner. To this end, a first fastening strut 84, which extends parallel with respect to the rotational axis of the round bale and serves as fastening for the depositing element 70, is fastened on the ramp frame 68. The depositing element 70 is fastened by way of pivoting joints 86, for example hinges, on the fastening strut 84 and can be pivoted in a vertical manner. A second fastening strut 88 extends parallel to the first fastening strut 84 on the side of the depositing element 70 opposite the pivoting joints 86. The second fastening strut 88 is fastened at the ends on the ramp frame 68. Spring elements 90, for example spiral springs or helical springs, extend between the depositing element 70 and the second fastening strut 88. The spring elements 90 effect a cushioning of the depositing element 70 when said element is pivoted vertically downwards under the load of the round bale during the unloading operation. At the same time, the pivoting angle is also defined as a result. Rubber springs or other resilient elements which cushion a pivoting movement of the depositing element 70 can also be arranged as an alternative. Under the influence of the weight of the round bale, the depositing element 70 or the flat section 78" is pivoted vertically downwards such that the spring elements 90 are resiliently deformed or compressed. Consequently, part of the energy introduced by the round bale is cushioned. As soon as the round bale has left the depositing element 70, the depositing element 70 is moved back into the initial position as a result of the relaxation of the spring elements 90. As an option, a resilient layer 80" can also be applied in this case to the flat section 78" (not shown in a hatched manner here), as also in the case of the exemplary embodiment to FIG. 2, in order to increase the cushioning effect even more. A corresponding covering 82" to protect the resilient layer is then also provided.

Common to the exemplary embodiments according to FIGS. 1 to 4 is that mechanical stress on the round bale is reduced by the depositing element (70) and, as a result, damage to the round bale is prevented, as in place of the usual use of rollers as the depositing element (70), in this case a flat section (78, 78', 78") is used as the depositing element, which can provide a higher contact surface for the round bale compared to a roller which means that, compared to the use of a roller, the surface pressure during the impact of the round bale is reduced in a decisive manner.

Having described the preferred embodiment, it will become apparent that various modifications can be made without departing from the scope of the invention as defined in the accompanying claims.

The invention claimed is:

1. A round baler comprising a frame, a baling chamber adapted for forming a round bale, the baling chamber being provided on the frame, an unloading area provided between the baling chamber and a ground surface and at least one depositing element arranged in the unloading area and extending parallel to the rotational axis of the round bale and serving to support the round bale during an unloading operation, the depositing element is provided as a non-rotatable flat section that is one of resiliently deformable such that the non-rotatable flat section deforms resiliently during the unloading operation under the influence of the round bale and provided with a resilient layer that deform resiliently during the unloading operation under the influence of the round bale, wherein the depositing element is a flat plate fastened at each end to an unloading ramp frame arranged in the unloading area and the resilient layer is provided on the flat plate.

2. The round baler according to claim 1, wherein the depositing element extends over at least part of the width of the round bale.

3. The round baler according to claim 1, wherein the depositing element is suspended so as to be pivotable and a pivoting movement is introduced during the unloading operation under the influence of the round bale, wherein the depositing element is connected to elements cushioning the pivoting movement.

4. The round baler according to claim 1, wherein the resilient layer is surrounded at least in part by a covering.

5. The round baler according to claim 4, wherein the resilient layer is formed from one of a foam material and an elastomer.

6. The round baler according to claim 3, wherein the depositing element is fastened to the unloading ramp frame by one or more pivoting joints.

\* \* \* \* \*